Figure 1:
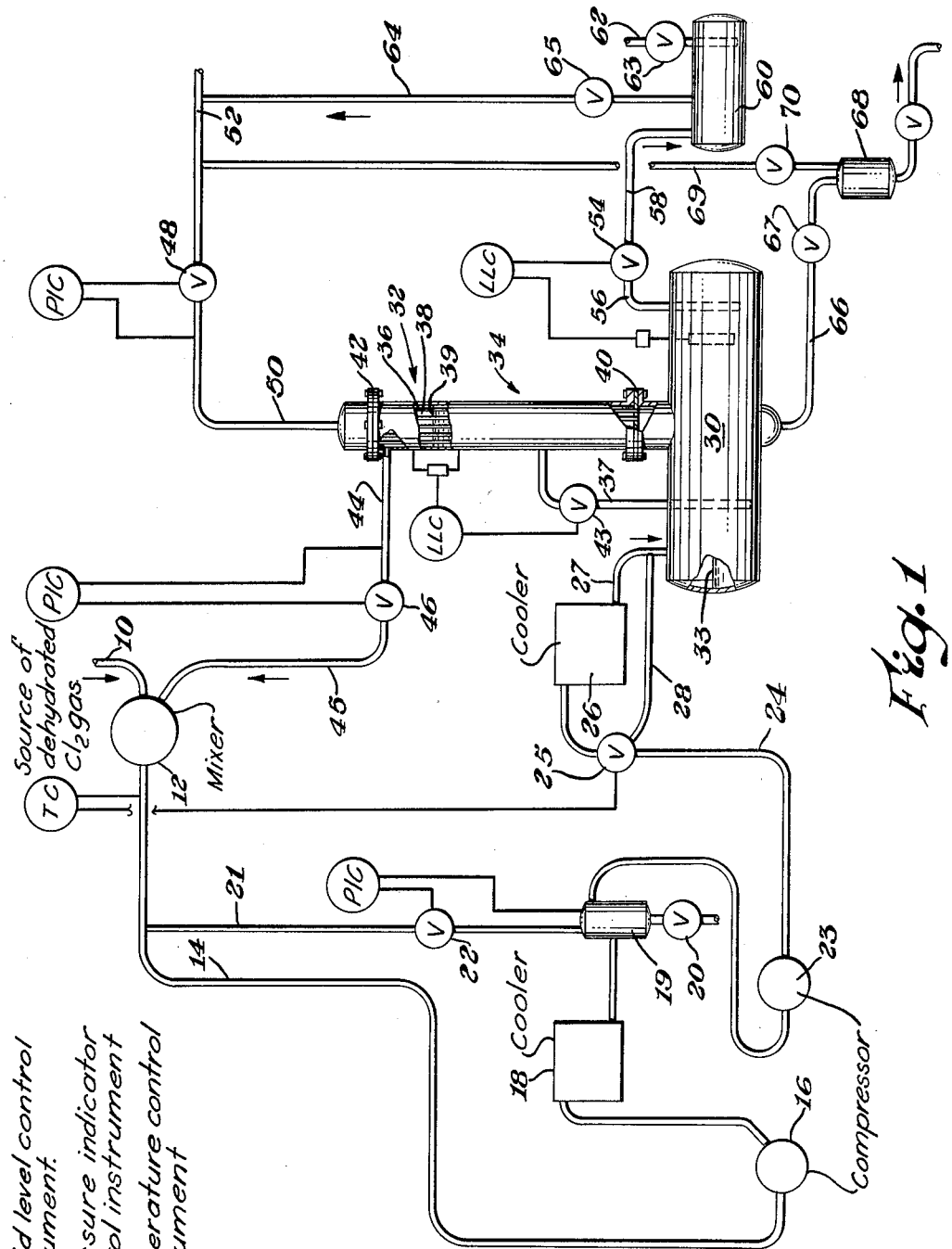

United States Patent Office 3,230,724
Patented Jan. 25, 1966

3,230,724
CHLORINE GAS LIQUEFACTION
Alfred M. Havas, Midland, Mich., assignor to The Dow Chemical Company, Midland, Mich., a corporation of Delaware
Filed Oct. 22, 1962, Ser. No. 231,944
3 Claims. (Cl. 62—21)

The invention relates to an improved process of and apparatus for the liquefaction of a gas containing a contaminating difficultly condensable gas and more particularly for the liquefaction of chlorine gas contaminated with air.

In a number of industrial and domestic processes, the liquefaction of a gas is an essential stage or step therein, e.g., purification, refrigeration, heat exchange, and volume reduction for purposes of shipment or storage. Gas liquefaction may be carried out by compressing the gas and bringing the thus compressed gas into indirect heat exchange relationship with a refrigerant to cool the gas to condense it to a liquid. A refrigerant may be defined as a volatile liquid which absorbs heat at a low temperature by vaporization during the indirect heat exchange relationship and subsequently dissipates this heat by condensation thereof at a relatively high temperature. By indirect heat exchange relationship is meant that contact effectuated by providing a system whereby the refrigerant and the gas to be liquefied are caused to flow in independent circulating systems which are separated from each other only by heat-conducting walls during the heat exchange period. Such systems are often broadly termed vapor-compression refrigeration systems.

The manner and means of liquefaction of a gas are of considerable consequence because of the economic aspects associated therewith: it requires relatively large amounts of power; it requires condensation and volatilization steps and hence requires a unit comprising appropriate pumps, valves, conduits, heat exchangers, and the like; the attendant needs for operation and maintenance are appreciable since such a unit contains precise and close-fitting working parts in a pressure control system; the refrigerant must be a substance convertible from liquid to gas and vice versa at temperatures which are not impractically high or low at the pressures employed, is capable of taking up large amounts of heat during the evaporation or volatilization stage, and which does not freeze under the conditions of use. A fully satisfactory refrigerant must possess still other characteristics for specific jobs, one of which is availability. Any liquefiable gas (or volatilizable liquid) having a critical temperature within a practical range may be used as a refrigerant in a vapor-compression refrigeration system. Many substances have been proposed and used as refrigerants, e.g., Freon (mixture of fluoro- and chloromethanes and ethanes), sulfur dioxide, ammonia, lower boiling hydrocarbons, carbon dioxide, lower boiling aliphatic ethers, and di- and trihaloethylenes. Air and oxygen are now used under certain conditions for refrigerants because of their availability and high vapor pressure at low temperatures. However, their low critical temperature inherently tends to limit the extent of their use except where such low temperature offers a decided advantage.

Illustrative of an industrial operation, wherein liquefaction of a gas is a step, is in the production of chlorine. Chlorine gas is commonly produced by the electrolysis of sodium chloride brine. Chlorine gas so produced is invariably contaminated with some air. Prior to transportation or storage, the chlorine is usually liquefied. Because of the presence of the air therein, only a portion of the chlorine gas can be liquefied by passing it successively through a closed system comprising a series of compressor-cooler stages adapted for chlorine liquefaction, because, the presence of the air adversely affects the vapor pressure curves of chlorine and when the air is subsequently vented, the escape of the air carries with it appreciable amounts of gaseous chlorine. Since only the chlorine and not the air is liquefied at pressures and temperatures commonly available, the percent of air in a chlorine-gas mixture increases during conventional liquefaction of chlorine. For example, a gaseous mixture consisting by volume of 90% chlorine and 10% air, when calculated at the constant temperature of 20° C. and subjected to increasing pressure, undergoes some chlorine liquefaction at 106 pounds per square inch absolute (p.s.i.a.); at about 200 p.s.i.a., the unliquefied portion is about 50% chlorine and 50% air; at about 500 p.s.i.a., the unliquefied portion is about 20% chlorine; and at about 1000 p.s.i.a., the unliquefied portion is 10% chlorine and 90% air.

I have discovered that the liquefaction of a large portion of the chlorine, contaminated by a difficultly condensable gas such as air, which remains after a major portion of a body of chlorine gas has been liquefied by conventional techniques, can be conveniently and effectively done by controlling and directing the already-liquefied liquid chlorine and the unliquefied gaseous chlorine, containing the contaminating gas, whereby some of the already-liquefied chlorine is advantageously employed directly as the refrigerant to liquefy an appreciable portion of the unliquefied chlorine substantially free of the contaminating gas, e.g., air. By the term "major portion" as used herein is meant more than fifty percent by weight of the body of chlorine.

Predicated on such discovery, the present invention, comprising an improved method and apparatus for liquefying a gas having a critical temperature above about −30° F. containing difficultly condensable gaseous contaminants and especially of chlorine contaminated by air as a step in the production thereof, was made.

Liquefaction of chlorine gas and separation therefrom of difficultly condensable contaminating gases, in accordance with the invention, in a broad sense, consists essentially of: liquefying a major portion of a body of chlorine contaminated with such gases; separating the body of chlorine into an upper gaseous phase and a lower liquid phase and maintaining such phases; reducing the pressure thereon to effect a controlled outward flow of gaseous chlorine together with the contaminating gases from the upper gaseous phase and to effect a controlled independent outward flow of liquid chlorine from the lower phase; bringing the flow of liquid chlorine and the flow of gaseous chlorine containing the contaminating gases into indirect heat exchange relationship and maintaining the liquid chlorine in an ebullient state whereby it continues to volatilize, cool, and absorb heat from the gaseous chlorine in indirect heat exchange relationship therewith to liquefy substantially all of said gaseous chlorine; recycling the so-volatilized and cooled chlorine to the incoming supply of chlorine gas for liquefying; venting any unliquefied chlorine from said gaseous phase together with uncondensed contaminating gases and recovering liquid chlorine, which was liquefied during said heat exchange relationship from the flow of gaseous chlorine from said gaseous phase.

Liquefaction of chlorine according to one embodiment of the invention may be considered to comprise (1) introducing chlorine consisting of liquid chlorine and air-contaminated gaseous chlorine into a reservoir; (2) controlling the pressure and temperature in the reservoir to maintain both a liquid chlorine phase and a gaseous chlorine-air phase; (3) forcing a plurality of individually confined substantially parallel streams of air-contaminated gaseous chlorine, having interspaces thereamong, upwardly from the reservoir while simultaneously forcing liquid chlorine into the interspaces among said confined streams to maintain a desired liquid chlorine level in the interspaces; (4) maintaining a pressure in the interspaces which is sufficiently less than that in said reservoir to cause the liquid chlorine to volatilize in said interspaces thereby cooling chlorine gas in the confined streams to cause a substantial portion thereof to condense to liquid chlorine and fall back into the reservoir; (5) removing the thus volatized chlorine from the interspaces; (6) continuing to force liquid chlorine from the reservoir into the interspaces to maintain the desired level of liquid chlorine therein (7) continuing to force gaseous chlorine, contaminated with air, from the reservoir upwardly in the individually confined streams; (8) disposing of that portion of the chlorine gas being forced upwardly in said confined streams, which does not condense when in contact with the volatilizing chlorine, together with contaminating air present therein; and (9) removing liquid chlorine from the reservoir which is in excess of that necessary to maintain a level thereof in the reservoir.

The invention also contemplates and embodies a method of and apparatus for liquefying chlorine gas contaminated with difficultly condensable gases such as the constituents of air comprising: (1) mixing chilled chlorine gas with the contaminated chlorine gas so as to lower the average temperature of the resulting gas mixture; (2) compressing the so-obtained gas mixture to a pressure greater than the vapor pressure of chlorine at 45° F.; (3) cooling the so-compressed gas mixture so as to liquefy the major portion of the chlorine therein; (4) separating the so-liquefied chlorine from the uncondensed gases comprising contaminants and uncondensed chlorine; (5) reducing the ambient pressure on a portion of the so-separated liquefied chlorine so as to cool it and produce chilled chlorine gas by the so-induced evaporation from the portion, said so-chilled chlorine being delivered to the aforesaid first step of this embodiment; (6) bringing the separated uncondensed gases into heat exchange relation with the portion of liquid chlorine being evaporated in the previous step so as to cool the uncondensed gases thereby to effect condensation of residual chlorine therein; (7) separating the so-condensed liquid chlorine from the remaining uncondensed gases; and (8) combining the so-separated liquid chlorine with the product in the third step of this embodiment thereby obtaining substantially all the chlorine in liquid form.

The term "major portion" as used herein, as aforesaid, means more than 50% by weight. It is preferred that the liquid portion be not more than 80% by weight in the third step above. Usually between about 60 and 70% of the body of chlorine is liquefied in the third step.

One mode of carrying out the method of the invention and a structural embodiment of the apparatus of the invention are depicted in the annexed drawing.

Figure 2:
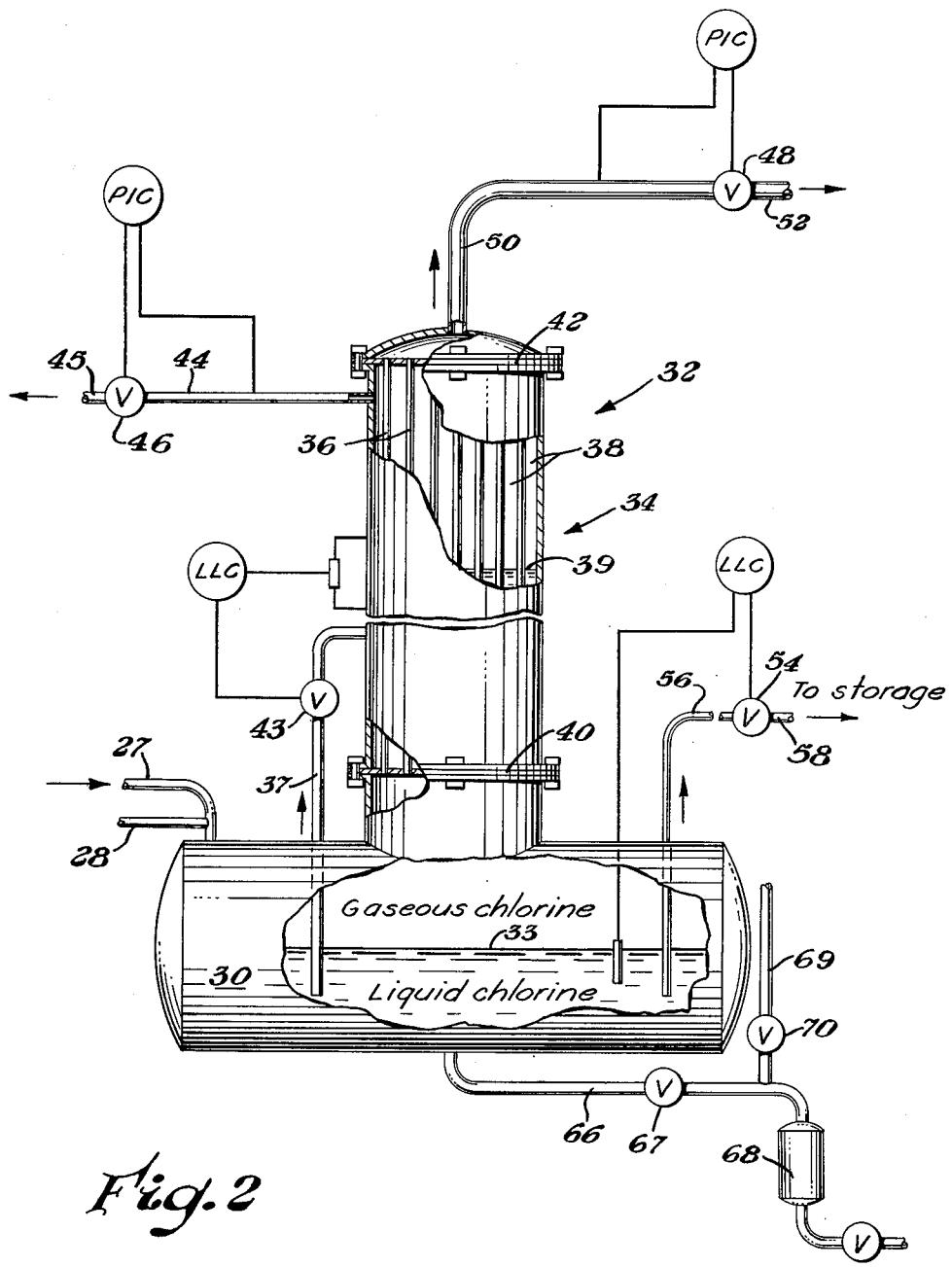

FIGURE 1, thereof, is a flow sheet representing a complete process whereby a portion of a body of chlorine gas is liquefied and thereafter a substantial portion of the remaining unliquefied gas is liquefied substantially free of air. FIGURE 2 is illustrative of the liquefaction apparatus of the invention wherein chlorine gas remaining unliquefied by conventional compression and condensation is stripped from contaminating gases.

FIGURE 1 shows conduit 10, leading from a source of chlorine gas, e.g., a series of chlorine cells (not shown) and conducting chlorine gas feed (containing some air admixed therewith), which has been dehydrated, e.g., by passing it through aqueous $H_2SO_4$ in a dehydrator (not shown) into mixing tank 12, where it is mixed with chilled chlorine gas produced as a by-product during the liquefaction and purification of chlorine according to the invention. From the mixing tank, the resulting cooled gaseous mixture passes through conduit 14 to first stage compressor 16 and then into water-cooled cooler 18. The thus compressed and cooled chlorine gas (still containing the air) passes into stabilizer pot 19 (which serves both as a means to maintain a stabilized pressure and also as a separator by permitting some separation of both sediment and volatile gas to the extent necessary to maintain the desired pressure therein) the sediment settling to the bottom of stabilizer pot 19 (from which it may be periodically removed by opening valve 20) and usually some volatile gas (dependent on pressure) passing upwardly through line 21 and re-entering conduit 14 as controlled by pressure controlled valve 22. The chlorine from stabilizer pot 19 then enters second stage compressor 23 from which it passes, by way of line 24, through three-way temperature controlled valve 25 and, in accordance with the temperature of the chlorine feed in conduit 14, either passes on into water-cooled cooler 26, and out line 27 or is diverted into by-pass line 28. Valve 25, therefore, provides a way of maintaining a ratio of liquid chlorine to gaseous chlorine to provide an average of more than 50 weight percent but generally an average of not more than 80 weight percent of liquid chlorine. The chlorine from line 27 leading either from cooler 26 or from by-pass line 28, consisting of more than 50 percent but not more than 80 percent liquid and balance gas, than passes on into more-or-less horizontally positioned tank 30 of the liquefier assembly identified generally by numeral 32, wherein both the gaseous and liquid chlorine phases are maintained at the level in tank 30 indicated by numeral 33.

Substantially vertical heat exchanger 34 is positioned directly above tank 30. It comprises tubes 36 and interspaces 38 thereamong. Tube sheets 40 and 42 near the lower and upper ends of heat exchanger 34, respectively, have perforations therein aligned with tubes 36 to provide communication between tank 30 and the tubes but to prevent communication between tank 30 and interspaces 38.

A pressure below the vapor pressure of chlorine at the temperature employed and markedly lower than the pressure in tank 30 is maintained in interspaces 38 by means of pressure controlled valve 46.

Pipe 37 leads from a point below the liquid chlorine level 33 in tank 30 into interspaces 38 of the heat exchanger. Due to the lower pressure maintained in the interspaces, liquid chlorine from tank 30 rises through pipe 37 and empties into the interspaces. A level of liquid chlorine designated 38 is maintained in interspaces 38 by means of liquid level controlled valve 43.

Because the pressure in interspaces 38 is markedly less than the vapor pressure of chlorine at the existing temperature, the liquid chlorine therein is in a highly ebullient state, chlorine gas rapidly evaporating therefrom and passing out through pipe 44 and thence into pipe 45, as controlled by pressure controlled valve 46, and then into mixing tank 12 to provide the chilled chlorine gas of step (1) of one embodiment of the method of the invention.

Tubes 36, being in communication with the chlorine gas-filled upper portion of tank 30, are filled with rising chlorine gas due to a desired controlled reduced pressure in the tubes maintained by pressure controlled valve 48. The rapidly evaporating chlorine in interspaces 38, chill the walls of tubes 36 and the chlorine gas therein so that a substantial proportion of the chlorine gas in the tubes is liquefied and falls back into tank 30. A small proportion thereof, which is not liquefied, together with the uncondensable gases present, chiefly air, passes out into line 50 and thence into line 52 to storage or use as controlled by valve 48.

A level of chlorine is maintained in tank 30 at level 33 by liquid level controlled valve 54, which provides for liquid chlorine, in excess of that level, to pass upwardly in pipe 56 and thence through pipe 58 into tank 60.

From tank 60 the liquid chlorine is removed as necessary through line 62, provided with valve 63, to greater capacity storage or tank cars or for use directly in a process for which high purity liquid chlorine is employed. Pipe 64, through which flow is controlled by valve 65, leads from the top of tank 60 to gas discharge pipe 52 for the purpose of drawing off sufficient chlorine gas to provide reduced pressure in tank 60 to provide for the flow of liquid chlorine from tank 30. Pipe 66, having valve 67 therein, leads from the bottom of tank 30 to pot 68 and provides a means for removing any sludge from the liquefier. Pipe 69 having valve 70 therein provides for flow of gas from pot 69 to gas discharge line 52.

FIGURE 2 is an enlargement of liquefier 32 of FIGURE 1, in some detail, together with certain of the more closely associated structural parts employed in its operation. The structural elements shown in FIGURE 2 correspond with the same parts shown diagrammatically in FIGURE 1 and bear the same identifying numerals.

The mode of practicing the invention employing, for purposes of illustration, dehydrated effluent chlorine gas from a bank of chlorine cells in series, containing some air admixed therewith (e.g., from 3 to 4 percent by weight) may be described in reference to FIGURES 1 and 2 as follows:

The chlorine gas-air mixture, at a temperature, e.g., of about 95° F. and at pressure, e.g., of about 14 pounds per square inch absolute (hereinafter abbreviated p.s.i.a.) is conducted, together with chilled chlorine gas volatilized in the interspaces of the heat exchanger during the liquefaction in accordance with the invention, into mixing tank 12. The temperature of the resulting gas mixture is accordingly considerably lower than that of the chlorine feed, e.g., a resulting temperature of about 40° F., and then compressed in compressor 16, e.g., to about 82 p.s.i.a., where the temperature thereof due to the heat of compression is raised, e.g., to about 240° F. The thus compressed gas is then passed through water-cooled cooler 18 where the temperature is reduced, e.g., to about 95° F. Thence it passes through stabilizer pot 19 and then into compressor 23 where the pressure is raised, e.g., to about 155 p.s.i.a. and the temperature raised, as a result of the heat of compression, e.g., to about 195° C. The thus compressed gas is then passed through three-way valve 25. This valve responds to temperature variations in conduit 14 to direct the chlorine from compressor 23 either into cooler 26 or through line 28 which by-passes the cooler. For example, if the temperature in conduit 14 is higher than desired, valve 25 will divert the chlorine into by-pass line 28 to provide a higher proportion of gaseous chlorine for subsequently absorbing the heat from the evaporating chlorine in the heat exchanger interspaces, thereby resulting in an increased amount of chilled gas for recycling to mixer 12. On the other hand, if the temperature in conduit 14 is lower than desired, valve 25 will direct the chlorine from compressor 23 into cooler 26 to provide a higher proportion of liquid chlorine and accordingly a less proportion of gaseous chlorine to absorb heat from the evaporating chlorine in the heat exchanger interspaces, thereby resulting in a decreased amount of chilled gas for recycling to mixer 12.

A suggested operating temperature for the liquid and gaseous chlorine from either line 27, out of cooler 26, or from by-pass line 28 is about 95° F. when the temperature of available cooling water is about 75° to 85° F. Therefore, the chlorine from compressor 23 will pass through cooler 26 at least part of the time at such operating temperatures.

From either line 27 or line 28, the liquid and gaseous chlorine, with the contaminating air, pass into tank 30 and exist therein in a lower liquid phase and an upper gaseous phase, the phase separation being maintained at level 33. It is understood that liquid level 33 may be at any level in tank 30 so long as some liquid and some gas are present.

By means of pressure controlled valve 46, the pressure in interspaces 38 is lower than in tank 30 and, accordingly, some liquid chlorine is caused to rise through pipe 37 from tank 30 into interspaces 38 where the level thereof is maintained at level 39 by liquid level controlled valve 43. It is understood that this level may fluctuate at any level in the heat exchanger so long as some liquid is provided. However, since heat transfer through the walls of a heat exchanger is much better when the fluids in contact therewith are liquids, a relatively high level of liquid is usually maintained.

As the liquid chlorine empties into interspaces 38 from pipe 37, it undergoes an abrupt drop in pressure, e.g., from about 155 p.s.i.a. to about 5 p.s.i.a. The abrupt pressure drop is accompanied by rapid evaporation and cooling. Such rapid cooling chills the rising chlorine gas in tubes 36 to below their liquefaction temperature. The liquefaction is inherently accompanied by a marked reduction in volume which provides the desired pressure gradient between the interior of the tubes and tank 30 to insure continuous rising of chlorine gas from the tank into the tubes. It is to be noted that liquid level controlled valve 54 provides for the removal of liquid chlorine from tank 30 to tank 60, subject however to the needs of liquid level controlled valve 43, which functions to maintain the desired level 39 in interspaces 38.

The liquid chlorine, having undergone such a marked drop in pressure as above indicated as it entered interspaces 38, is in a highly boiling state, is rapidly evaporating from interspaces 38, and is leaving by way of line 44. The pressure in interspaces 38, and accordingly the rate of evaporation of liquid chlorine from interspaces 38, is controlled by pressure controlled valve 46 between lines 44 and 45. The chlorine gas thus evaporated and thereby cooled, e.g., to a temperature of −18° F., is returned to mixing tank 12. It should be noted that, although line 64 is shown leading from tank 60 to line 52, it may (since it is pure chlorine) be desirable to position it so it leads back to line 45 or to line 14 rather than to the greater air contaminated line 64. However, the volume of chlorine released from tank 60 is small and there are limited but important uses of chlorine gas wherein high percentages of air may be tolerated. Among such uses are the manufacture of NaClO, i.e., soda bleach, and Ca(ClO)$_2$, i.e., lime bleach, both widely used to bleach paper pulp. For the manufacture of such bleaches, Cl$_2$ (which may contain large amounts of air) may be forced into either aqueous caustic soda or lime water and the by-product NaCl or CaCl$_2$ removed to produce either the soda bleach or the lime bleach.

The pressure controlled valves and liquid level controlled valves employed herein may be any of the conventional type instruments used for automatically regulating the flow of a confined fluid in response to changes in pressure and of a liquid level, respectively. Typical of such instruments and illustrative of those satisfactory for use in the practice of the invention are described in Catalogue No. 86 R, pages 6 and 7 (1950) of the Taylor Instrument Company, Rochester, New York and Catalogue No. F 4A, pages 3 and 11 (1957) of the Fisher-Governor Company, Marshalltown, Iowa.

Liquefaction of chlorine in accordance with the invention, employing the temperatures and pressures at the various stages expressed in the preceding descriptive material, may be typified by the quantities employed in the two following runs, expressed in pounds per hour:

| Run No.* | Gaseous feed | Chlorine recycled as refrigerant | Recovered as liquid Chlorine | Recovered as gas |
|---|---|---|---|---|
| 1 | 605.17 Cl₂, 10.15 air. | 313 | 286 | 6.17 Cl₂, 10.15 air. |
| 2 | 4679 Cl₂, 78 air. | 2,420 | 2,210 | 49 Cl₂, 73 air. |

* All units are in pounds per hour.

It is to be understood that the drawing and the description thereof, as well as the above typical runs, are illustrative only of the invention. For example, instead of the two-stage compression system shown, only one stage of compression or three or more stages of compression may be employed. Other temperatures and pressures may be employed and variations in design and structure from that shown may be made so long as the method and apparatus are within the scope of the invention and fall within the broad concept thereof as defined by the appended claims.

A number of advantages stem from the practice of the invention among which are:

(1) It expeditiously permits dispensing with the need for a separate refrigeration system and separate refrigerant since chlorine, which is present as the substance to be liquefied, is used as the refrigerant.

(2) It employs a refrigerant possessing the capacity of removing a greater number of heat units when a given weight thereof is converted to a gas in contrast to the more widely used refrigerants. For example, a pound of Freon 12 (a mixture of dichlorotetrafluoroethane and monochlorodifluoromethane), when converted to a gas at 80° F., removes 60.52 B.t.u. whereas a pound of chlorine, when converted to a gas at the same temperature of 80° F. removes 95.2 B.t.u.

(3) The cold chlorine gas resulting from the converted chlorine liquid employed as the refrigerant in the invention may be admixed with the incoming chlorine gas feed thereby lowering the temperature thereof very markedly and lessening the compression and cooling requirements of the chlorine gas feed prior to the actual liquefaction. For example, for similar sized units, the practice of the invention permits a two-stage compression system, whereas, without the advantages of using the chilled gas in accordance with the invention, at least a three-stage compression system is required.

(4) The recycled cold chlorine gas has had the air removed therefrom and does not further dilute the chlorine feed.

Having described my invention, what I claim and desire to protect by Letters Patent is:

1. The method of liquefying chlorine gas contaminated with a difficultly condensable gas so as to obtain chlorine present therein substantially free of contaminating gas comprising the steps of: (1) compressing a mixture comprising a recycle gaseous chlorine product and an incoming gaseous chlorine feed containing such contaminating gas to convert at least a major portion of the chlorine to liquid chlorine containing such contaminating gas; (2) directing the resulting compressed fluid into first and second streams, at least one of which is provided with a cooling means, the proportion of said fluid passing through each of said streams being determined by a control means responsive to the temperature of the gaseous mixture of recycle chlorine product and incoming chlorine feed; (3) combining said first and second streams to form a fluid comprising a major proportion of liquid chlorine and a minor proportion of gaseous chlorine containing said contaminating gases; (4) introducing said mixture into a confined body of chlorine; (5) separating the body of chlorine into an upper gaseous phase and a lower liquid phase and maintaining such phases; (6) reducing the pressure on the body of chlorine to effect a controlled outward flow of gaseous chlorine together with the contaminating gases from the upper gaseous phase and to effect a controlled independent outward flow of liquid chlorine from the lower liquid phase; (7) reducing the pressure of the chlorine thereby causing the flow of liquid chlorine and the flow of gaseous chlorine containing the contaminating gases to enter into indirect heat exchange relationship and maintaining the liquid chlorine in an ebullient state whereby it continues to volatilize, cool, and absorb heat from the gaseous chlorine in indirect heat exchange relationship therewith to liquefy substantially all of said gaseous chlorine and returning the thus liquefied chlorine to said body of chlorine; (8) recycling the volatilized and cooled chlorine as the recycle gaseous chlorine product, to the incoming gaseous chlorine feed; (9) venting any unliquefied chlorine from said gaseous phase together with condensed contaminating gases; and (10) withdrawing liquid chlorine from said body of chlorine, in accordance with a liquid control level means, during said heat exchange relationship thereby to maintain the gaseous phase and the liquid phase in said body of chlorine.

2. The method according to claim 1 wherein said recycle gaseous chlorine product is chilled prior to admixture with said incoming gaseous chlorine feed.

3. The method according to claim 1 wherein said mixture of recycle gaseous chlorine product and incoming gaseous chlorine feed is subjected to a pressure of at least 80 pounds per square inch absolute and wherein the accompanying rise in temperature of the thus compressed mixture of chlorine gases is promptly reduced by cooling by heat exchange with water at a temperature of between about 75° F. and 85° F. until between about 50% and about 80% by weight of the chlorine mixture is liquid.

References Cited by the Examiner

UNITED STATES PATENTS

| | | | |
|---|---|---|---|
| 1,913,628 | 6/1933 | Falkenberg | 62—31 XR |
| 2,211,547 | 8/1940 | Reichert. | |
| 2,475,957 | 7/1949 | Gilmore | 62—27 |
| 2,685,181 | 8/1954 | Schlitt | 62—30 XR |
| 2,692,484 | 10/1954 | Etienne | 62—28 XR |
| 2,754,666 | 7/1956 | Spitzer. | |
| 2,940,271 | 6/1960 | Jackson | 62—23 XR |

NORMAN YUDKOFF, *Primary Examiner.*